United States Patent [19]

Shah

[11] Patent Number: 5,543,455

[45] Date of Patent: Aug. 6, 1996

[54] WATERBORNE CONTACT ADHESIVE

[75] Inventor: Pankaj Shah, Crystal Lake, Ill.

[73] Assignee: Morton International, Inc., Chicago, Ill.

[21] Appl. No.: 404,670

[22] Filed: Mar. 15, 1995

[51] Int. Cl.⁶ .................................................. C08K 3/18
[52] U.S. Cl. .................................................. 524/521
[58] Field of Search .................................................. 524/521

[56] References Cited

U.S. PATENT DOCUMENTS

| | | | |
|---|---|---|---|
| 3,084,067 | 4/1963 | Smith | 524/521 |
| 5,413,815 | 5/1995 | Williams | 524/145 |
| 5,416,134 | 5/1995 | Skoglund | 524/521 |

*Primary Examiner*—Kriellion S. Morgan
*Attorney, Agent, or Firm*—Wayne E. Nacker; Gerald K. White

[57] ABSTRACT

A waterborne contact adhesive comprises and aqueous emulsion of A) between about 50 and about 80 weight percent (based on A) plus B) solids) of an emulsified acrylic polymer, said acrylic polymer having an acid number of between about 5 and about 50, and an N-methylol acrylamide content of between about 0.5 and about 5 wt % based on monomer solids; B) between about 20 and about 50 weight percent (based on A) plus B) solids) of a latex of an elastomer, particularly natural rubber latex, and C) anionic surfactant in amount sufficient to stabilize the aqueous dispersion of A) and B).

7 Claims, No Drawings

WATERBORNE CONTACT ADHESIVE

The present invention is directed to a contact adhesive composition and particularly to a waterborne contact adhesive.

BACKGROUND OF THE INVENTION

By "contact adhesive" is meant herein an adhesive which is typically applied to two surfaces to be adhered together, dried to form clear film adhesive layers, and brought into contact with pressure so as to form an immediate, durable bond. Such adhesives are used, for example, in laminating plastic, such as Formica®, to particle board for kitchen counter tops (high pressure laminate (HPL)) and for gluing foam to wood in sandwich panels. Once the contact adhesives are pressed together, the adhered pieces are to be ready for further processing, such as cutting; contact adhesives being formulated so as not to require adhesive curing to achieve the requisite bond strength.

Most contact adhesives, heretofore, have been solvent-borne. Low boiling point organic solvents as carriers for contact adhesives provide the advantage of rapid dry times, whereupon the workpieces may be contact-adhered very soon after application of the adhesive composition. Increasingly, however, organic-borne compositions are becoming disfavored for the volatiles they release both to the immediate workplace or the general environment.

Waterborne contact adhesives have been developed, Fastbond® adhesives produced by 3M being a prime example. While Fastbond® adhesives have met with considerable success, they are based primarily on neoprene latexes, a relatively expensive substance. Resistivity to high temperature of Fastbond® is less than desired. High-temperature resistance is important in a contact adhesive as the adhered workpieces may be subject to further processing, such as cutting, which may generate considerable localized heat and may result, for example, in delamination at the edges. Also, Fastbond®, like most other waterborne contact adhesives, still contains some organic solvent.

SUMMARY OF THE INVENTION

In accordance with the invention there ia provided a waterborne contact adhesive composition comprising A) between about 50 and about 80 weight percent (based on A) plus B) solids) of an emulsified acrylic polymer, said acrylic polymer having an acid number of between about 5 and about 50, and an N-methylol acrylamide content of between about 0.5 and about 5 wt % based on monomer solids, B) between about 20 and about 50 weight percent (based on A) plus B) solids) of a latex of an elastomer, and C) anionic surfactant in amount sufficient to stabilize an aqueous dispersion of A) and B).

DETAILED DESCRIPTION OF THE PRESENT INVENTION

Unless otherwise stated, in reference to polymers, monomer residue content herein will be expressed in wt % monomer solids; acrylic polymer content and elastomer content will be weight percent of the total solids of the acrylic polymer content plus the elastomer content; and amounts of other components, such as surfactant, will be in phr (parts per hundred resin, by weight) based on the total solids of the acrylic polymer content plus the elastomer content.

The emulsified acrylic polymer A) is formed of vinyl monomers, such as acrylic monomers and styrene monomers. In accordance with the invention, an essential monomer is N-methylol acrylamide which must be present at between about 0.5 and about 5 wt % based on monomer solids. The acid number is achieved by incorporation of carboxylic functional monomers, such as acrylic acid, methacrylic acid, and itaconic acid. Other typical comonomers include, but are not limited to, acrylate esters, e.g., $C_1$–$C_6$-alkyl esters of acrylic acid and methacrylic acid, vinyl acetate, styrene, s-methyl styrene, vinyl toluene, acrylamide, and methacrylamide.

The acrylic polymer emulsion A) is preferably formed by conventional emulsion polymerization by preparing a monomer mix and an anionic surfactant into an aqueous medium containing a free radical initiator, such as potassium persulfate. The polymer is produced under conditions which result in a very high molecular weight such that the emulsified acrylic polymer is a gel that is insoluble in organic solvents. In this gelled state, no actual molecular weight can be determined. The acrylic polymer should have a glass transition ($T_g$) of between about −50° and about 50° F. A commercially available acrylic polymer emulsion is Carbobond™ sold by BF Goodrich. This polymer is believed to be formed from styrene, butyl-acrylamide, acrylamide, and N-methlylol acrylamide, and itaconic acid and has an acid number of about 15.

The elastomer is selected from rubber latexes, such as natural rubber latex, styrene/butadiene rubber latex, and neoprene latex. The preferred latex at this time is natural rubber latex, an inexpensive material which gives excellent performance. Natural rubber has a wide molecular weight distribution, and it is believed that the lower molecular weight molecules contribute significantly to tackiness of the contact adhesive. Neoprene rubber latex has similarly been found to give excellent results, but is a more expensive material.

The elastomer latex B) is necessary for good bonding to be achieved as the acrylic resin alone does not give good bonding as a latex adhesive. As noted above, contact adhesives based primarily on neoprene do not give good high-temperature adhesion. Accordingly, the acrylic polymer A) solids are used at a level of between about 50 and about 80 wt % and the elastomer latex B) solids are used at between about 20 and about 50 wt % based on total weight of A) plus B) solids. Within this range, higher levels of acrylic polymer A) tends to give better bonding, but at higher composition cost.

Although the acrylic polymer emulsion A) is formed using anionic surfactants, such as sodium lauryl sulfate or Darvan-SMO® (sulfated methyl oleate), additional anionic surfactant usually needs to be added to the composition to stabilize the aqueous dispersion of A) plus B). Total level of anionic surfactant C), in the composition is from about 0.1 to about 1 phr, preferably from about 0.2 to about 0.5 phr. In preparing the composition of the present invention, additional anionic surfactant is generally added to the acrylic polymer emulsion before the acrylic polymer emulsion is admixed with the elastomer latex.

Natural rubber, as generally provided, is inherently incompatible with the acrylic polymer emulsion. Natural rubber, so as not to be subject to biological degradation, is typically stabilized with ammonia and typically has a pH in the range of 10. On the other hand, the acrylic polymer, with its high carboxylic functionality, has a pH in the range of 2.5. Accordingly, to compatibilize the two major components, not only is anionic surfactant added to the acrylic polymer emulsion, but ammonia is added to adjust the pH to between about 6.5 and about 9.5. The final pH of the waterborne composition is between about 7 and about 11, preferably between about 9 and about 10.5. The higher pHs may require additional ammonia.

The composition may contain minor amounts of conventional additives, such as is known in the art. For example, a defoamer is typically used at a level in the range of about 0.005 to about 0.1 phr. A chelating agent may be added to stabilize the composition against heavy metals.

The solids level of the composition as a whole must be consistent with the acrylic polymer and elastomer remaining as an emulsion. Also, the viscosity should be suitable for ease of application to substrate surfaces. On the other hand, relatively high solids levels are desired so as to promote rapid dry times. Thus, the solids level is typically between about 50 and about 70% with currently preferred embodiments being in the range of about 60%.

The composition is applied by conventional methods to surfaces of workpieces to be joined. The composition may be air dried, but is more rapidly dried using infrared lamps to flash water therefrom. When the water content is sufficiently low, i.e., about 10 wt % or less and preferably about 5 wt % or less, the layer is suitable as a contact adhesive. The coated work pieces can then be pressed together. The pressure applied depends upon the workpieces being bonded. In bonding foams, pressures of 3–5 psi are typical. For bonding Formica® to particle board, pressures of at least about 50 psi are typically used. An immediate, very permanent bond is formed.

The adhesive is suitable for bonding a wide variety of substrates, including wood, plastic, plastic foam, metal, etc.

An important advantage of the contact adhesive of the present invention is its relatively long open time, i.e., the composition is suitable as a contact adhesive upward of about 30 minutes after it is applied and dried. This is important if it is not possible to contact the materials to be adhered immediately after the contact adhesive is applied and dried, as may occur in some large-scale operations.

The invention will now be described in greater detail by way of specific Examples.

EXAMPLE 1

Adhesives A and B were formulated as follows (in wt %):

| Component | A | B |
| --- | --- | --- |
| Hycar ® 26373 Acrylic (BF Goodrich) 58% solids* | 55.31 | 67.30 |
| Natural Rubber Latex NC-405 | 40.89 | 29.87 |
| 33% Darvan ® WAQ in water (surfactant) | 0.50 | 0.38 |
| 33% Darvan ® SMO in water (surfactant) | 0.72 | 0.54 |
| 20% Versene ® 100 in water (chelating agent) | 0.47 | |
| Aquamix ® 125 (antioxidant) | 0.82 | 0.41 |
| 28% ammonia solution | 1.28 | 1.50 |
| Bubblebreaker ® 748 (defoamer) | 0.01 | |

| Properties of Adhesives A and B | A | B |
| --- | --- | --- |
| Viscosity 75–77° F. #3 40 rpm (cps) | 2000–7000 | 2000–7000 |
| Wt./Gal. | 8.3 ± 0.2 | 8.3 ± 0.1 |
| Total solids (wt. %) | 59 ± 2.0 | 59 ± 1.0 |
| pH | 9.8 ± 0.5 | 9.3 ± 0.5 |

*polymer formed from butyl acrylate, styrene, acrylamide, formaldehyde, butanedioic acid, itaconic acid, acrylamide, and n-methylolacrylamide; acid no. 15.

Adhesive A was prepared by loading Hycar® and defoamer 748 into a closed mixing vessel. Ammonia solution was added very slowly under high speed agitation to avoid lump formation. Then the surfactant solutions, antioxidant dispersion and rubber latex were added. The composition was mixed for 30 minutes under slight vacuum to remove bubbles. Viscosity, pH and wt./gal. were checked and the composition filtered through a 400 micron filter.

Adhesive B was prepared by blending all components except the acrylic latex in a closed mixing vessel under high speed mixing. The acrylic latex was slowly added as high speed mixing continued. Viscosity, pH and wt./gal. were checked and the composition filtered through a 100 micron filter.

Each of adhesives A and B was used to adhere Formica® to particle board and aluminum to plywood (lauan). Application level was at 8–10 grams/square foot (wet). The adhesives were dried either for ten minutes in air or two minutes under I.R. lamps. Lap shear strengths were measured at various temperature. Results showing strong bonding, even at elevated temperatures, are as follows.

| | −20° F. | | 72° F. | | 170° F. | | 200° F. | |
| --- | --- | --- | --- | --- | --- | --- | --- | --- |
| | PSI | Failure | PSI | Failure | PSI | Failure | PSI | Failure |
| Adhesive A LAP SHEAR HPL/PARTICLE BOARD | | | | | | | | |
| AIR DRIED 10' | | | | | | | | |
| 1 | 229 | 100% Particle Board | 216 | 75% Adhesive 25% Cohesive | 28 | 50% Cohesive 50% Particle Board | 7 | 100% Cohesive |
| 2 | 159 | 100% Particle Board | 197 | 75% Cohesive 25% Adhesive | 21 | 100% Cohesive | 18 | 100% Cohesive |
| 3 | 249 | 100% Particle Board | 146 | 75% Cohesive 25% Adhesive | 21 | 100% Cohesive | — | — |
| Ave. | 212 | 100% Particle Board | 186 | 58% Cohesive 42% Adhesive | 23 | 83% Cohesive 17% Particle Board | 13 | 100% Cohesive |
| IR DRIED 2' | | | | | | | | |
| 1 | 300 | 100% Particle Board | 235 | 100% Particle Board | 28 | 100% Cohesive | 16 | 100% Cohesive |
| 2 | 275 | 100% Particle Board | 230 | 60% Adh./30% Coh. 10% Particle Board | 24 | 100% Cohesive | 18 | 100% Cohesive |

-continued

| | −20° F. | | 72° F. | | 170° F. | | 200° F. | |
|---|---|---|---|---|---|---|---|---|
| | PSI | Failure | PSI | Failure | PSI | Failure | PSI | Failure |
| 3 | 321 | 100% Particle Board | 222 | 25% Coh./50% Adh./ 25% Particle Board | 14 | 90% Cohesive 10% Particle Board | — | — |
| Ave. | 299 | 100% Particle Board | 229 | 45% Particle Board 37% Adh./18% Coh. | 22 | 97% Cohesive 3% Particle Board | 17 | 100% Cohesive Cohesive |

Adhesive A
LAP SHEAR
ALUMINUM/LAUAN

AIR DRIED 10'

| | −20° F. | | 72° F. | | 170° F. | | 200° F. | |
|---|---|---|---|---|---|---|---|---|
| 1 | 424 | 95% Lauan 5% Cohesive | 148 | 100% Adhesive | 70 | 95% Adh./3% Lauan/ 2% Cohesive | 29 | 95% Coh./3% Adh/ 2% Lauan |
| 2 | 337 | 75% Cohesive 25% Lauan | 122 | 80% Adh./15%Coh./ 5% Lauan | 35 | 80% Cohesive 20% Adhesive | 20 | 95% Coh./3% Adh/ 2% Lauan |
| 3 | 346 | 100% Lauan | 108 | 95% Adhesive 5% Lauan | 49 | 75% Adhesive 25% Cohesive | — | — |
| Ave. | 369 | 73% Lauan 27% Cohesive | 126 | 92% Adh./7% Coh./ 1% Lauan | 51 | 63% Adh./36% Coh./ 1% Lauan | 25 | 95% Coh./3% Adh/ 2% Lauan |

IR DRIED 2'

| 1 | 275 | 75% Cohesive 25% Lauan | 117 | 100% Adhesive | 44 | 50% Cohesive 50% Adhesive | 17 | 100% Cohesive |
| 2 | 341 | 80% Coh./10% Adh./ 10% Lauan | 114 | 100% Adhesive | 41 | 80% Cohesive 20% Adhesive | 15 | 100% Cohesive |
| 3 | 343 | 80% Cohesive 20% Lauan | 144 | 100% Adhesive | 34 | 90% Cohesive 10% Adhesive | — | — |
| Ave. | 320 | 78% Cohesive 18% Lauan/4% Adh. | 125 | 100% Adhesive | 40 | 73% Cohesive 27% Adhesive | 16 | 100% Cohesive |

Adhesive was spray applied to both substrates at 8–10 Gm/Ft$^2$

| | −20° F. | | 72° F. | | 170° F. | | 200° F. | |
|---|---|---|---|---|---|---|---|---|
| | PSI | Failure | PSI | Failure | PSI | Failure | PSI | Failure |

Adhesive B
LAP SHEAR
HPL/PARTICLE BOARD

AIR DRIED 10'

| 1 | 275 | 100% Particle Board | 203 | 100% Cohesive | 62 | 50% Cohesive 50% Adhesive | 31 | 100% Cohesive |
| 2 | 231 | 100% Particle Board | 250 | 100% Particle Board | 57 | 50% Cohesive 50% Adhesive | 24 | 100% Cohesive |
| 3 | 242 | 100% Particle Board | 230 | 100% Particle Board | 46 | 50% Cohesive 50% Adhesive | — | — |
| Ave. | 249 | 100% Particle Board | 228 | 67% Particle Board 33% Cohesive | 55 | 50% Cohesive 50% Adhesive | 28 | 100% Cohesive |

IR DRIED 2'

| 1 | 290 | 100% Particle Board | 207 | 100% Particle Board | 29 | 100% Cohesive | 17 | 100% Cohesive |
| 2 | 288 | 100% Particle Board | 230 | 100% Cohesive | 42 | 100% Cohesive | 15 | 100% Cohesive |
| 3 | 282 | 100% Particle Board | 236 | 100% Particle Board | 34 | 100% Cohesive | — | — |
| Ave. | 287 | 100% Particle Board | 225 | 67% Particle Board 33% Cohesive | 35 | 100% Cohesive | 16 | 100% Cohesive |

Adhesive B
LAP SHEAR
ALUMINUM/LAUAN

AIR DRIED 10'

| 1 | 431 | 100% Aluminum | 295 | 100% Adhesive | 94 | 100% Adhesive | 59 | 100% Adhesive |
| 2 | 431 | 100% Aluminum | 297 | 100% Adhesive | 98 | 100% Adhesive | 55 | 100% Adhesive |
| 3 | 426 | 100% Aluminum | 293 | 100% Adhesive | 83 | 100% Adhesive | — | — |
| Ave. | 429 | 100% Aluminum | 282 | 100% Adhesive | 92 | 100% Adhesive | 57 | 100% Adhesive |

IR DRIED 2'

| 1 | 431 | 100% Aluminum | 169 | 100% Adhesive | 30 | 50% Adhesive 50% Cohesive | 21 | 100% Cohesive |
| 2 | 432 | 100% Aluminum | 60 | 75% Cohesive 25% Adhesive | 37 | 50% Adhesive 50% Cohesive | 17 | 100% Cohesive |
| 3 | 220 | 90% Cohesive 10% Adhesive | 183 | 100% Adhesive | 40 | 50% Adhesive 50% Cohesive | — | — |
| Ave. | 361 | 67% Aluminum | 137 | 75% Adhesive | 36 | 50% Adhesive | 19 | 100% Cohesive |

-continued

| | −20° F. | | 72° F. | | 170° F. | | 200° F. |
|---|---|---|---|---|---|---|---|
| PSI | Failure | PSI | Failure | PSI | Failure | PSI | Failure |
| | 30% Cohesive 3% Adhesive | | 25% Cohesive | | 50% Cohesive | | |

Adhesive was spray applied to both substrates at 8–10 Gm/Ft²

COMPARATIVE EXAMPLE 3

3M Fastbond® NF was used to adhere Formica® to particle board. Lap shear strength at 76° F. was 62 psi with 100% cohesive failure mode. Lab shear strength at 165° F. was 12 psi with 100% cohesive failure mode. This compares unfavorably with Compositions A and B (at 72° and 170° F.). In this regard, the high temperature strength is most significant.

EXAMPLE 4

Adhesive C was formulated as follows (in wt %):

| Component | C |
|---|---|
| Hycar ® 26084 Acrylic (BF Goodrich) 58% solids | 21.57 |
| Polycryl ®* | 49.01 |
| Natural Rubber Latex NC-407 | 20.31 |
| 33% Darvan ® WAQ in water (surfactant) | 0.39 |
| 33% Darvan ® SMO in water (surfactant) | 0.54 |
| 20% Versene ® 100 in water (chelating agent) | 0.37 |
| Aquamix ® 125 (antioxidant) | 0.37 |
| Bubblebreaker ® 748 | 0.03 |
| Polyphobe ® 104 | 6.00 |
| Polyphobe ® 106HE | 1.41 |

*A polymer formed by emulsion polymerization, (in wt % monomer solids): acrylamide 1.37, N-methylol acrylamide 2.20, vinyl acetate 59.32, ethyl acrylate 36.19, and itaconic acid 0.92; acid no.: 7.9.

The Hycar, Polycryl and defoamer were loaded into a closed mixing vessel. Under moderate to high speed agitation, all surfactant solutions, antioxidant and rubber latex were added. Polyphobe 104 was added very slowly under high speed agitation to avoid lump formation; then Polyphobe 106HE was added in a similar manner. Mixing continued for 60 minutes using slight vacuum to get rid of bubbles. pH, wt/gal and viscosity were checked.

| Properties of Adhesive C | C |
|---|---|
| Viscosity 75–77° F. | 140,000–190,000 cps #5 2.5 rpm |
| Wt./Gal. | 8.65 ± 0.2 |
| Total solids (wt. %) | 48 ± 2.0 |
| pH | 7.5 |

What is claimed is:

1. A contact adhesive composition which is an aqueous emulsion comprising
   A) between about 50 and about 80 weight percent (based on A) plus B) solids) of an emulsified acrylic polymer, said acrylic polymer having an acid number of between about 5 and about 50, and an N-methylol acrylamide content of between about 0.5 and about 5 wt % based on monomer solids of said acrylic polymer A),
   B) between about 20 and about 50 weight percent (based on A) plus B) solids) of a latex of an elastomer, and
   C) anionic surfactant in amount sufficient to stabilize an aqueous dispersion of A) and B).

2. The composition in accordance with claim 1 at a solids level of between about 50 and about 70 wt. %.

3. The composition in accordance with claim 1 having a pH of between about 7 and about 11.

4. The composition in accordance with claim 1 having a pH of between about 9 and about 10.5.

5. The composition in accordance with claim 1 wherein said elastomer is selected from the group consisting of natural rubber, neoprene latex, styrene/butadiene rubber latex and mixtures thereof.

6. The composition in accordance with claim 1 wherein said elastomer is natural rubber.

7. A method of adhering a surface of a first workpiece to a surface of a second workpiece comprising
   applying to each of said workpiece surfaces a layer of an aqueous emulsion of a contact adhesive composition comprising
   A) between about 50 and about 80 weight percent (based on A) plus B) solids) of an emulsified acrylic polymer, said acrylic polymer having an acid number of between about 5 and about 50, and an N-methylol acrylamide content of between about 0.5 and about 5 wt % based on monomer solids of said acrylic polymer A),
   B) between about 20 and about 50 weight percent (based on A) plus B) solids) of a latex of an elastomer, and
   C) anionic surfactant in amount sufficient to stabilize an aqueous dispersion of A) and B);
   drying said layers on each of said surfaces; and
   pressing said workpieces together to contact said dried layers and thereby form an adhesive bond.

\* \* \* \* \*

UNITED STATES PATENT AND TRADEMARK OFFICE
CERTIFICATE OF CORRECTION

PATENT NO. : 5,543,455
DATED : August 6, 1996
INVENTOR(S) : Pankaj, Shah

It is certified that error appears in the above-indentified patent and that said Letters Patent is hereby corrected as shown below:

Col. 2, line 13 of the patent, "s-methyl" should be "α-methyl" (alpha-methyl)

Col. 6, line 3 (under the column labeled "200°F: Failure" -- delete "cohesive"

Col. 8, lines 55--, missing claims 8-12.

Signed and Sealed this

Second Day of September, 1997

BRUCE LEHMAN

Attest:

Attesting Officer

Commissioner of Patents and Trademarks